(12) United States Patent
Quignard et al.

(10) Patent No.: US 12,049,591 B2
(45) Date of Patent: Jul. 30, 2024

(54) BITUMENS COMPRISING UNCONVENTIONAL BITUMEN BASES

(71) Applicant: IFP Energies Nouvelles, Rueil-Malmaison (FR)

(72) Inventors: Alain Quignard, Rueil-Malmaison (FR); Wilfried Weiss, Rueil-Malmaison (FR); Isabelle Merdrignac, Rueil-Malmaison (FR); Jeremie Barbier, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 120 days.

(21) Appl. No.: 17/409,856

(22) Filed: Aug. 24, 2021

(65) Prior Publication Data

US 2022/0064537 A1  Mar. 3, 2022

(30) Foreign Application Priority Data

Aug. 31, 2020  (FR) ........................................ 2008827

(51) Int. Cl.
| | | |
|---|---|---|
| *C08L 95/00* | (2006.01) | |
| *C10C 3/02* | (2006.01) | |
| *C10C 3/06* | (2006.01) | |

(52) U.S. Cl.
CPC ................ *C10C 3/06* (2013.01); *C08L 95/00* (2013.01); *C10C 3/02* (2013.01)

(58) Field of Classification Search
CPC ...................................................... C08L 95/00
See application file for complete search history.

(56) References Cited

U.S. PATENT DOCUMENTS

| | | | | |
|---|---|---|---|---|
| 3,440,074 | A | * | 4/1969 | Thomas .................... C10C 3/04 208/6 |
| 4,693,752 | A | * | 9/1987 | Elias ....................... C08L 95/00 208/23 |
| 10,377,900 | B2 | | 8/2019 | Mouazen et al. |
| 10,597,535 | B2 | | 3/2020 | Ruot et al. |
| 2016/0280919 | A1 | | 9/2016 | Mouazen et al. |
| 2017/0137718 | A1 | | 5/2017 | Bolliet et al. |
| 2018/0244920 | A1 | | 8/2018 | Ruot et al. |

FOREIGN PATENT DOCUMENTS

| | | | |
|---|---|---|---|
| EP | 0240090 B1 | * | 8/1990 |
| FR | 3013053 A1 | | 5/2015 |
| WO | 2015/144689 A1 | | 10/2015 |
| WO | 2017/046523 A1 | | 3/2017 |

OTHER PUBLICATIONS

Search Report dated Mar. 11, 2021 issued in corresponding FR 2008827 application (2 pages).

* cited by examiner

*Primary Examiner* — Alexandra M Moore
(74) *Attorney, Agent, or Firm* — MILLEN, WHITE, ZELANO & BRANIGAN, P.C.; Csaba Henter

(57) ABSTRACT

Between 40% and 75% by weight of a first bitumen base B1 an asphalt obtained by a solvent deasphalting of a first vacuum residue R1 resulting from the distillation of an effluent hydroconverted by a process for the ebullated bed hydroconversion of a heavy hydrocarbon feedstock, and
  Between 25% and 60% by weight of a second bitumen base B2 and/or of a flux F, F at least one heavy aromatic cut with a hydrogen content of greater than 8.5% by weight, B2, R1 or a second vacuum residue R2 resulting from a distillation of a crude oil or a mixture of R1 and R2.

17 Claims, No Drawings

BITUMENS COMPRISING UNCONVENTIONAL BITUMEN BASES

TECHNICAL FIELD

The present invention relates to the field of bitumens, in particular to the composition of bitumens for the construction of roads and for public works (e.g. impermeable bitumens). The present invention relates more specifically to bitumens formulated from unconventional bitumen bases, comprising in particular a bitumen base consisting of the final residue from a process for the ebullated bed hydroconversion of a heavy liquid hydrocarbon feedstock, i.e. an asphalt resulting from the solvent deasphalting of the vacuum residue from the hydroconverted effluent.

PRIOR ART

Bitumens, also known as bituminous binders, are mixtures of hydrocarbons widely used as surfacings in the field of road construction or of civil engineering. Bitumens are generally formed of a mixture of "bitumen bases", which are conventionally obtained from the treatment of a crude oil.

Bitumens are conventionally prepared from residues resulting from a unit for the vacuum distillation, without any post-treatment, of asphaltenic specific crude oils, known as "bitumen crudes". However, these bitumen crudes represent approximately 10% of all the crude oils, which constitutes a constraint for the production of bitumens.

Other methods for the preparation of bitumens exist, which are based, for example, on the partial oxidation of residues from the direct distillation of crude oils, when the characteristics of the residue are too far from those specific to bitumens, an operation known under the name of "bitumen blowing" which modifies the properties of the residues, or which are based, for example, on the deasphalting, using paraffinic solvents, such as propane, butane or the mixture of the two, of residues resulting from the direct distillation of a crude oil, or also, for example, which are based on the use of visbreaking residues, although the properties of the latter are mediocre for producing bitumens, in particular with regard to the thermal oxidation stability of the bitumens. However, these methods of preparation are either expensive, as for bitumen blowing, or depend once again on bitumen crudes, as is the case for the bitumen bases resulting from the deasphalting of bitumen crudes, or result in bitumens of mediocre quality, as is the case for the bitumen bases resulting from visbreaking residues.

In addition, the supplying with abovementioned conventional bitumen bases, resulting from the direct distillation of bitumen crudes, is dependent on the number of refineries, which is sometimes caused to decrease in some regions of the world, such as in Europe, which can then constitute an additional constraint for the production of bitumens.

There thus exists a need to produce bitumens of good quality while being freed as much as possible from the use of bitumen crudes or from expensive techniques targeted at modifying the properties of bitumen bases.

Furthermore, there exist, in refineries, residues resulting from processes for the hydroconversion of heavy hydrocarbon feedstocks which are difficult to enhance in value, containing high contents of impurities, such as metals, sulfur, nitrogen, Conradson carbon and heptane insolubles, also known as $C_7$ asphaltenes, employed to produce fuel bases. Generally, such residues, which are typically the vacuum residues produced by distillation of the hydroconverted effluent, are used as bunker oils having a high sulfur content. However, these fuels are less and less in demand commercially as a result in particular of the introduction of stricter standards with regard to the emissions of sulfur from the combustion flue gases for ships, which are the main consumers of fuels of this type. This is the case, for example, of the vacuum residues resulting from the atmospheric and then vacuum distillation of a hydroconverted effluent in an ebullated bed hydroconversion process of H-Oil™ type, or of the vacuum residues in the form of a suspension, referred to as slurry vacuum residues, resulting from the atmospheric and then vacuum distillation of a hydroconverted effluent in an entrained bed, also known as slurry, hydroconversion process. The entrained bed hydroconversion process is based on the use of a catalyst dispersed in the feedstock in the form of very small particles, the size of which is less than 500 prn, typically of between 1 nm and 200 nm, indeed even between 1 nm and 20 nm, and which exits from the hydroconversion reactor with the hydroconverted effluent. The mixture of the hydroconverted effluent and the catalyst exiting from the entrained bed reactor is subsequently referred to as the slurry hydroconverted effluent, i.e. itself in the form of a suspension.

It is possible to use such residues for the formulation of bitumens. Such residues are not regarded as being conventional bitumen bases, such as those mentioned above.

Compositions for road bitumens comprising a hydroconversion residue resulting from an ebullated bed hydroconversion process of H-Oil™ type, as a mixture with a conventional bitumen base, such as described in U.S. Pat. No. 4,904,305, are thus known. However, the content of residue in such a bitumen is low, typically between 2% and 10%, which is not optimal in terms of enhancement in value of the hydroconversion residue.

The use of slurry hydroconversion residue as bitumen base for forming a road bitumen, as described in Patent Application US20170137718, is also known. Here again, the content of hydroconversion residue in the composition of the bitumen is limited, typically of between 1% and 30% by weight. In addition, the presence of catalyst dispersed in the hydroconversion residue limits the maximum possible content of the slurry residue in the bitumen and requires a stage of filtration of the slurry residue in order to tend towards the 30% by weight. This is because the presence of catalyst influences the physicochemical properties of the bitumen and can, for example, reduce its solubility and modify its rheological properties.

Higher contents of residues from the hydroconversion of heavy feedstocks in a bitumen composition are, for example, disclosed in U.S. Pat. No. 4,683,005. However, in the bitumens disclosed in this patent, the hydroconversion residue has to result from a hydroconversion process exhibiting a degree of conversion necessarily of greater than 80%, which brings about not insignificant operating constraints.

The inventors have demonstrated that, surprisingly, relatively large amounts of heavy products resulting from processes for the ebullated bed hydroconversion of a liquid heavy hydrocarbon feedstock can be used to form bitumens which have unexpected advantageous properties, in particularly a good thermal oxidation stability.

In particular, the inventors have demonstrated that it is possible to form bitumens having advantageous properties, and in particular in accordance with the standards for the construction and the surfacing of roads, in particular in accordance with the European standards, indeed even for impermeable surfacings, starting from crude oils unconventional for the production of bitumens (different from said "bitumen crude" oils), while maximally enhancing in value the final residues from a process for the hydroconversion of liquid heavy feedstocks, i.e. the asphalt resulting from the deasphalting of the heavy fraction of an ebullated bed hydroconverted effluent.

It has turned out, surprisingly, that it is possible to form bitumens in accordance with these standards, without resorting to techniques for modification of the properties of the bitumens, such as, for example, the operations for the partial oxidation of residues known as bitumen blowing, and without necessarily using bitumen crudes, by using an asphalt obtained by a solvent deasphalting of a vacuum residue resulting from a process for the ebullated bed hydroconversion of liquid heavy feedstocks, and what is more in relatively large amounts, as a mixture with another bitumen base and/or a flux.

The inventors have thus demonstrated that it is in particular possible to formulate bitumens in accordance with these standards exclusively starting from ebullated bed hydroconversion residues, normally used as fuels (high-sulfur heavy fuel oils), including final residues which are difficult to enhance in value, the production of which during these hydroconversion processes it is generally desired to minimize.

The formulation of such bitumens thus constitutes another means of enhancing these ebullated bed hydroconversion residues in value, the market for high-sulfur heavy fuel oils being in well-known decline as a result of the introduction of the 0.5% of sulfur specification worldwide for fuels used by all ships not equipped with devices for the removal of sulfur in the combustion flue gases (scrubbers), in force since $1^{st}$ January 2020.

The inventors have also demonstrated the advantageous use of an aromatic extract resulting from the manufacture of lubricating oils, as a mixture with such an asphalt obtained by deasphalting of a vacuum residue resulting from an ebullated bed hydroconversion process, to form bitumens in accordance with the standards in force.

OBJECTIVES AND SUMMARY OF THE INVENTION

It is an objective of the present invention to provide bitumens in accordance with the standards in force, in particular with the standards of European origin, such as NF EN 12591 with regard to road bitumens, while maximally enhancing in value the final residues of a process for the hydroconversion of liquid heavy feedstocks in an ebullated bed, i.e. the asphalt resulting from the deasphalting of the heavy fraction of an ebullated bed hydroconverted effluent.

Another objective of the present invention consists in providing bitumens in accordance with such standards, starting from oils other than "bitumen crudes".

Yet another objective of the present invention consists in providing bitumens in accordance with such standards, comprising a maximum of ebullated bed hydroconversion residues, including a large part of the final residue from the process for the hydroconversion of liquid heavy feedstocks in an ebullated bed, i.e. the asphalt resulting from the deasphalting of the heavy fraction of an ebullated bed hydroconverted effluent.

Thus, in order to achieve at least one of the objectives targeted above, among others, the present invention provides, according to a first aspect, a bitumen comprising:

between 40% and 75% by weight of a first bitumen base B1 consisting of an asphalt obtained by a solvent deasphalting of a first vacuum residue R1 resulting from the distillation of an effluent hydroconverted by a process for the ebullated bed hydroconversion of a heavy hydrocarbon feedstock, B1 having a softening point of between 50° C. and 110° C., and between 25% and 60% by weight of a second bitumen base B2 and/or of a flux F, F consisting of at least one heavy aromatic cut having a starting point of greater than 350° C., a 90% distilled point of less than 650° C. according to Standard ASTM D2887 and a hydrogen content of greater than 8.5% by weight, B2 consisting of R1 or a second vacuum residue R2 resulting from a distillation of a crude oil or consisting of a mixture of R1 and of R2, it being understood that said bitumen comprises at the most:

75% by weight of 131 when said bitumen consists of 131 and F,

50% by weight of 131 when said bitumen consists of 131 and B2, and

70% by weight of 131 when said bitumen consists of 131 and a mixture of F with B2, and the sum of the percentages by weight of B1, B2 and F being equal to 100%.

According to one or more embodiments of the invention, the heavy aromatic cut is an aromatic cut extracted from vacuum distillates obtained in a process for the manufacture of lubricating oils.

According to one or more embodiments of the invention, the heavy hydrocarbon feedstock sent into the hydroconversion process contains hydrocarbon fractions, at least 80% by weight of which have a starting boiling point of at least 300° C., and is preferably a crude oil, or consists of atmospheric residues and/or of vacuum residues resulting from the atmospheric and/or vacuum distillation of a crude oil, and preferably consists of vacuum residues resulting from the vacuum distillation of a crude oil.

According to one or more embodiments of the invention, R2 results from the atmospheric and vacuum distillation of a crude oil having been used as feedstock in the ebullated bed hydroconversion process.

According to one or more embodiments of the invention, R1 comprises a residual fraction boiling at a temperature of greater than or equal to 540° C. and is obtained by atmospheric and vacuum distillation of the effluent hydroconverted by the process for the ebullated bed hydroconversion of the heavy hydrocarbon feedstock, said process comprising at least one hydroconversion stage, and preferably two hydroconversion stages, carried out under an absolute pressure of between 2 MPa and 38 MPa, at a temperature of between 300° C. and 550° C., at an hourly space velocity HSV, with respect to the volume of each three-phase reactor, of between 0.05 $h^{-1}$ and 10 $h^{-1}$ and under an amount of hydrogen mixed with the heavy hydrocarbon feedstock of between 50 and 5000 standard cubic metres ($Sm^3$) per cubic metre ($m^3$) of heavy hydrocarbon feedstock.

According to one or more embodiments of the invention, B1 is an asphalt obtained by a deasphalting of R1 with a hydrocarbon solvent predominantly comprising compounds having 3 to 4 carbon atoms, preferably butane or propane or their mixture, with a solvent/feedstock ratio (volume/volume) of between 4/1 and 10/1, a temperature of between 40° C. and 150° C., and a pressure of between 2 MPa and 6 MPa.

According to one or more embodiments of the invention, the bitumen consists of B1 and R1.

According to one or more embodiments of the invention, the bitumen consists of B1 and F.

According to one or more embodiments of the invention, the bitumen consists of B1 and a mixture of R1 and/or R2 with F.

According to one or more embodiments of the invention, 131 represents between 40% and 60% by weight of the bitumen, R1 and/or R2 represents between 25% and 45% by weight of the bitumen and F represents between 5% by weight and 15% by weight of the bitumen.

According to one or more embodiments of the invention, 131 represents between 40% and 55% by weight of the bitumen, R1 and/or R2 represents between 30% and 45% by weight of the bitumen and F represents between 5% by weight and 15% by weight of the bitumen.

According to one or more embodiments of the invention, the bitumen consists of B1 and a mixture of R1 and F, with B1 and R1 representing between 85% and 95% by weight of the bitumen and F representing between 5% by weight and 15% by weight of the bitumen.

The bitumen according to the invention is preferably a road bitumen, having a ring and ball softening point of greater than or equal to 43° C. and less than 58° C. and a penetrability at 25° C. of greater than or equal to 35° C. and less than 100° C.

According to a second aspect, the present invention relates to a road surfacing consisting of a mixture of a bitumen according to the invention with an appropriate mineral aggregate.

According to a third aspect, the present invention relates to the use of an asphalt obtained by a solvent deasphalting of a first vacuum residue R1 resulting from the distillation of an effluent hydroconverted by a process for the ebullated bed hydroconversion of a heavy hydrocarbon feedstock, as a first bitumen base B1 for the preparation of a bitumen according to the invention, as a mixture with a second bitumen base B2 and/or a flux F, B1 having a softening point of between 50° C. and 110° C. and forming between 40% and 75% by weight of said bitumen, B2 and/or F forming between 25% and 60% by weight of said bitumen, B2 consisting of R1 or consisting of a second vacuum residue R2 resulting from the distillation of a crude oil or consisting of a mixture of R1 and R2, and F consisting of at least one heavy aromatic cut having a starting point of greater than 350° C., a 90% distilled point of less than 650° C. according to Standard ASTM D2887 and a hydrogen content of greater than 8.5% by weight, said bitumen comprising at the most 75% by weight of B1 when said bitumen consists of B1 and F, at the most 50% by weight of B1 when said bitumen consists of B1 and B2, and at the most 70% by weight of B1 when said bitumen consists of B1 and a mixture of F with B2, the sum of the percentages by weight of B1, B2 and F being equal to 100%.

According to a fourth aspect, the present invention relates to a process for the preparation of a bitumen according to the invention, said process comprising:

a first stage a) of hydroconversion of a heavy hydrocarbon feedstock, carried out in the presence of hydrogen in a first hydroconversion section comprising at least one three-phase reactor containing at least one hydroconversion catalyst operating as an ebullated bed, at an absolute pressure of between 2 MPa and 38 MPa, at a temperature of between 300° C. and 550° C., at an hourly space velocity, with respect to the volume of each three-phase reactor, of between 0.05 h$^{-1}$ and 10 h$^{-1}$, and with an amount of hydrogen of between 50 Sm$^3$/m$^3$ and 5000 Sm$^3$/m$^3$, so as to obtain a liquid hydroconverted effluent having a reduced content of C$_7$ asphaltenes, of Conradson carbon, of metals, of sulfur and of nitrogen;

optionally a stage b) of separation of the hydroconverted effluent resulting from the first hydroconversion stage to form at least one light fraction and one heavy fraction;

optionally a second stage c) of hydroconversion of the liquid hydroconverted effluent resulting from the first hydroconversion stage a) or of the heavy fraction resulting from stage b), carried out in the presence of hydrogen in a second hydroconversion section comprising at least one three-phase reactor containing at least one hydroconversion catalyst operating as an ebullated bed, at an absolute pressure of between 2 MPa and 38 MPa, at a temperature of between 300° C. and 550° C., at an hourly space velocity, with respect to the volume of each three-phase reactor, of between 0.05 h$^{-1}$ and 10 h$^{-1}$, and with an amount of hydrogen of between 50 Sm$^3$/m$^3$ and 5000 Sm$^3$/m$^3$;

a stage d) of atmospheric distillation followed by a vacuum distillation of a part or of the whole of the liquid hydroconverted effluent resulting from the first hydroconversion stage a) or of the liquid hydroconverted effluent resulting from the second hydroconversion stage c), producing at least one first vacuum residue R1 boiling predominantly at a temperature of greater than or equal to 350° C., said vacuum residue containing a residual fraction boiling at a temperature of greater than or equal to 540° C.;

a stage e) of deasphalting said first vacuum residue R1 resulting from stage d), at a temperature of between 40° C. and 150° C. and a pressure of between 2 and 6 MPa, with at least one hydrocarbon solvent predominantly comprising compounds having from 3 to 4 carbon atoms, preferably butane or propane or their mixture, and a solvent/feedstock ratio (volume/volume) of between 4/1 and 10/1, producing a deasphalted fraction DAO and an asphalt;

a stage f) of preparation of a bitumen comprising the mixing of a part or of the whole of the asphalt resulting from stage e) as a first bitumen base B1 with a second bitumen base B2 and/or a flux F, B2 consisting of a part of said first vacuum residue R1 and/or a second vacuum residue R2 resulting from the distillation of a crude oil, and F consisting of at least one heavy aromatic cut, in order to produce said bitumen so that it comprises between 40% and 75% by weight of B1 and between 25% and 60% by weight of B2 and/or F, with at the most 75% by weight of B1 when said bitumen consists of B1 and F, at the most 50% by weight of B1 when said bitumen consists of B1 and B2, and at the most 70% by weight of B1 when said bitumen consists of B1 and a mixture of F with B2, the sum of the percentages by weight of B1, B2 and F being equal to 100%.

Other subject-matters and advantages of the invention will become apparent on reading the description which follows of particular exemplary embodiments of the invention, given by way of non-limiting examples.

DESCRIPTION OF THE EMBODIMENTS

The bitumen according to the invention comprises:
between 40% and 75% by weight of a first bitumen base B1 consisting of an asphalt obtained by a solvent deasphalting of a first vacuum residue R1 resulting from the distillation of an effluent hydroconverted by a process for the ebullated bed hydroconversion of a heavy hydrocarbon feedstock, B1 having a softening point of between 50° C. and 110° C., and between 25% and 60% by weight of a second bitumen base B2 and/or of a flux F consisting of at least one heavy aromatic cut having a starting point of greater than 350° C., a 90% distilled point of less than 650° C. according to Standard ASTM D2887 and a hydrogen content of greater than 8.5% by weight, B2 consisting of R1 and/or a second vacuum residue R2 resulting from a distillation of a crude oil, it being understood that said bitumen comprises at the most:

75% by weight of B1 when said bitumen consists of B1 and F,

50% by weight of B1 when said bitumen consists of B1 and B2, and

70% by weight of B1 when said bitumen consists of B1 and a mixture of F with B2, and the sum of the percentages by weight of 131, B2 and F being equal to 100%.

In the continuation of the description, the following abbreviations are used for the sake of simplification of reading:

B1: first bitumen base of the bitumen according to the invention, i.e. the asphalt obtained by a solvent deasphalting of a first vacuum residue R1 resulting from the distillation of an effluent hydroconverted by a process for the ebullated bed hydroconversion of a heavy hydrocarbon feedstock;

B2: second bitumen base which can participate in the composition of the bitumen according to the invention, which is either R1 or R2 or a mixture of R1 and R2;

R1: first vacuum residue resulting from the distillation of the effluent hydroconverted by the process for the ebullated bed hydroconversion of a heavy hydrocarbon feedstock, which is sent to a solvent deasphalting stage which produces 31;

R2: second vacuum residue resulting from a distillation of a crude oil, i.e. resulting directly, without other treatment, from the distillation of a crude oil;

F: flux which can participate in the composition of the bitumen according to the invention, consisting of at least one heavy aromatic cut having a starting point of greater than 350° C., a 90% distilled point of less than 650° C. according to Standard ASTM D2887 and a hydrogen content of greater than 8.5% by weight, such as, for example, an aromatic extract resulting from the solvent extraction in a line for the production of lubricants, also known as oil line.

A few definitions are given below for a better understanding of the invention.

The bitumen according to the invention, or bituminous binder, is a mixture of bitumen bases or of one or more bitumen bases with a flux, and corresponds to a finished product, that is to say a product having physical properties appropriate for its final use, in particular in the field of road construction or civil engineering and preferably in the field of road construction.

In the present description, the expression bitumen base is used to denote a component of the bitumen, more specifically a fraction of the bitumen resulting from a given source, such a fraction generally having a chemical and physical signature, that is to say a given chemical composition and given physical properties characteristic of the source from which it originates. A bitumen base according to the invention exhibits physical properties specific to the bitumen, in particular certain properties relating to the hardness and the viscosity.

The important physical properties of the bitumen bases are in particular referenced in the prescriptive documents characterizing the bitumens. They are mainly properties of hardness and of viscosity. The important physical parameters characterizing road bitumens include, for example, according to Standard NF EN 12591, the softening point (ring and ball temperature in ° C.) and the penetrability at 25° C. (unit $\frac{1}{10}$ mm), which are measured according to standardized methods. These methods, the standards of which are listed in Standard NF EN 12591, are restated at the end of the present description.

In the present description, a flux is a component which makes it possible to fluidify the bitumen. The flux of the bitumen according to the invention can modify the properties of the bitumen base(s) of the bitumen according to the invention, in particular reduce the ring and ball softening point, and/or increase the penetrability at 25° C., and/or improve the oxidation stability (measurements of the ring and ball softening point and of the penetrability at 25° C., for example after RTFOT test).

The $C_7$ asphaltenes, also called asphaltenes in the present description, are heptane-insoluble compounds, according to Standard ASTM D6560 (corresponding to Standard NF T60-115).

In the present description, the pressures are expressed in absolute values, unless otherwise specified.

According to the invention, use is thus made of an asphalt obtained by a solvent deasphalting of R1 as a first bitumen base 31 for the preparation of a bitumen, as a mixture with B2 and/or F, 131 forming between 40% and 75% by weight of the bitumen, the remainder of the bitumen, i.e. between 25% and 60% by weight of the bitumen, consisting of B2 and/or F.

B1 has a softening point between 50° C. and 110° C., B2 consists of R1 and/or R2, F consists of at least one aromatic extract, and the bitumen comprises:

at the most 75% by weight of B1 when said bitumen consists of B1 and F, at the most 50% by weight of B1 when said bitumen consists of B1 and B2, and at the most 70% by weight of B1 when said bitumen consists of B1 and a mixture of F with B2.

While neither of the bitumen bases B1 and B2 can be used alone, that is to say without another component participating in the formulation of the bitumen, including a flux, in order to formulate a bitumen in accordance with the standards, in particular with the standards with regard to road bitumens, such as those of the document NF EN 12591, the advantageous combination of B1 with B2 and/or F in the proportions shown makes it possible.

First Bitumen Base B1

According to the invention, it is possible to formulate a bitumen with a large amount, i.e. from 40% to 75%, of asphalt obtained by a solvent deasphalting of a vacuum residue resulting from the distillation of an effluent hydroconverted by a process for the ebullated bed hydroconversion of a heavy hydrocarbon feedstock, which is the "final" residue of such a process.

The ebullated bed hydroconversion process and the production of this final residue participating in the composition of the bitumen according to the invention are described later.

The feedstock of the ebullated bed hydroconversion process which produces B1 is preferably a vacuum residue resulting from the direct distillation of a crude oil, i.e. without a stage other than the distillation (atmospheric and vacuum) of the crude oil.

Crude oil is also understood to mean a mixture of crude oils.

According to one embodiment, said crude oil is different from a bitumen crude, which makes it possible, for example, to be rid of the need to use a highly specific crude oil, i.e. a bitumen crude, and to enhance in value the products resulting from a refinery treating crude oils other than bitumen crudes for the manufacture of bitumens.

Bitumen crude is understood to mean crudes, the direct distillation residue by vacuum distillation of which makes it possible to have characteristics compatible with those desired for bitumens, for example in terms of penetrability or of softening point. Out of approximately 1300 crudes compiled in the world, only 10% are used by oil refiners to directly prepare bitumen bases. They concern heavy crudes having a high content of vacuum residue distilling above 500° C., indeed even 550° C. (of the order of 20% to 50% by weight), and the residual fraction of which has a high density, generally above 1030 kg/m$^3$, a viscosity at 100° C. generally greater than 3000 mm$^2$/s, a content of saturated hydrocarbons generally less than 10% with at most a few percent of paraffins and a fairly high to high content of heptane asphaltenes, generally greater than 10% by weight. These characteristics are often associated with a high sulfur content, generally of greater than 4% by weight: typical examples of bitumen crudes are heavy crudes from Venezuela or Mexico, or also the Arabian Heavy crude produced in Saudi Arabia.

For example, a vacuum residue typically used as feedstock of the ebullated bed hydroconversion process results from Ural crude oil, the direct distillation vacuum residue of which is much too soft to produce bitumen bases. It also comprises a fairly high content of paraffins, of the order of 15% by weight according to the cut point, and a low content of $C_7$ asphaltenes, of the order of 5% by weight according to the cut point.

On the other hand, the asphalt obtained from the deasphalting of the vacuum residue not converted after hydroconversion is much harder, with a very low content (negligible) of saturated hydrocarbons and a high content of aromatics, resins and asphaltenes, typically with a content of $C_7$ asphaltenes of between 10% and 40% by weight and a content of saturated hydrocarbons of less than 6% by weight.

B1 has a softening point of between 50° C. and 120° C. Preferably, B1 has a softening point of between 55° C. and 110° C. and more preferentially of between 70° C. and 100° C.

Preferably, B1 has a penetrability at 25° C. of less than 20 1/10 mm.

Such a final residue is different from the conventional bitumen bases, such as the atmospheric or vacuum distillation residues from crude oils, the visbreaking residues, or also slurry residues from catalytic cracking, such as fluid catalytic cracking (FCC), or ebullated bed hydroconversion vacuum residues, with regard to its chemical composition and its physicochemical and rheological properties, as a person skilled in the art knows.

Thus, the final residue used in the invention is different from the atmospheric or vacuum distillation residues from crude oils, which result from processes for the separation of various hydrocarbon cuts of the crude oil, during which the molecules do not undergo (or undergo little) transformation, unlike the heavy hydrocarbon feedstock in the ebullated bed hydroconversion process from which the final residue results. The atmospheric or vacuum residues resulting from the distillation of the crude oil can contain from 2% to 25% by weight of asphaltenes.

The visbreaking residues, more specifically the visbreaking vacuum residues, are residues resulting from the vacuum distillation of the products resulting from a visbreaking process. It is known that visbreaking denotes a treatment of heavy hydrocarbon feedstocks which consists in bringing these feedstocks in the liquid state in a furnace to a cracking temperature of the heaviest hydrocarbons. The cracking reaction can continue in a soaker, in which, without other heating, the feedstocks move at a rate such that, at the temperature under consideration, they have a residence time sufficient to obtain the desired cracking of the heavy molecules to give lighter molecules. The temperature is generally of the order of 400° C. to 500° C. and the pressure approximately 0.2 to 3 MPa. The cracking results in a reduction in the viscosity of the treated feedstock. The cracking products, including the gaseous products possibly formed, are discharged in the direction of an assembly for fractionation by atmospheric distillation and then by vacuum distillation. A visbroken residue (VBR) can contain from 10% to 30% by weight of asphaltenes.

The residues of catalytic cracking, such as the FCC process, result from processes in which the molecules are cracked to give lighter molecules in the presence of a specific cracking catalyst and optionally of molecular hydrogen. The FCC process is usually carried out at temperature conditions of 480° C. to 540° C. and pressure conditions of 0.2 MPa to 0.3 MPa. The 350° C.+ cut can contain from 0.1% to 8% by weight of asphaltenes.

The slurry residues are the final vacuum residues resulting from slurry-phase hydroconversion processes. Slurry-phase hydroconversion processes are carried out under very severe conditions in order to convert complex heavy feedstocks, for example, atmospheric residues and vacuum residues, residues resulting from a deasphalting unit, visbroken (thermal cracking) effluents, 350° C.+ heavy effluents resulting from an FCC unit, including the FCC slurry, shale oils, biomass, or also coal. Slurry-phase hydroconversion processes are usually carried out at a temperature of between 400° C. and 500° C., for example between 410° C. and 470° C., and at a hydrogen pressure generally of between 9 MPa and 25 MPa, for example between 10 and 17 MPa. The liquid hourly space velocity (ratio of the flow rate of the feedstock to the reaction volume) is typically between 0.05 and 1.5 h$^{-1}$. These processes are generally carried out in isothermal bubble column reactors. After a stage of hydroconversion in a reactor containing a catalyst as a slurry containing at least one metal, a separation of the hydroconversion effluent is carried out, which separation comprises three sub-stages each carried out in a distillation column: a distillation of the hydroconverted slurry effluent to give a C6− cut and a C6+ cut at high temperature and high pressure (approximately 300° C. and 15 MPa), subsequently an atmospheric distillation (at atmospheric pressure) of the C6+ cut to give a 350° C.+ cut at high temperature (approximately 300° C.), then a vacuum distillation, at high temperature (greater than 300° C.), of the 350° C.+ cut to form a 525° C.− cut and a 525° C.+ cut which corresponds to the final slurry residue. The slurry residue can contain a significant amount of asphaltenes, for example between 15% and 50% of asphaltenes, depending on the origin of the feedstock. However, as a result of the slurry technology based on the use of catalyst of very small size, the slurry residues differ from other residues in that they contain catalyst particles in a variable content, for example up to 5% by weight of the residue.

The vacuum residues of an ebullated bed hydroconversion process result from the atmospheric and then vacuum distillation of an effluent resulting from one or more ebullated bed hydroconversion stages, as described later for the hydroconversion process which is the source of B1 and R1. Such residues have a variable content of asphaltenes, also depending on the origin of the feedstock, and for example of greater than 5% by weight and less than 10% by weight. Unlike the slurry residues, they do not contain significant amounts of catalyst.

Second Bitumen Base B2

According to the invention, the bitumen can contain a second bitumen base B2 which is either the vacuum residue resulting from the same hydroconversion process which is the source of B1 (same feedstock treated and same process) or another vacuum residue R2 resulting from the direct distillation of a crude oil, with or without the presence of F in the bitumen. The second bitumen base can also consist of a mixture of R1 and R2.

First Vacuum Residue R1

The origin of R1 is described in detail below with the description of the ebullated bed hydroconversion process. R1 and B1 result from the same ebullated bed hydroconversion process.

Thus, as for 131, the feedstock of the ebullated bed hydroconversion process is preferably a vacuum residue resulting from the direct distillation of a crude oil (or a mixture of crude oils) and said crude oil can be different from a bitumen crude, as described above in connection with 31.

R1 does not contain catalyst particles, or possibly in the form of traces (<100 mg/kg).

R1 can have a content of $C_7$ asphaltenes of greater than 5% and less than 10% by weight.

R1 can have a content of saturated hydrocarbons of greater than 10% by weight.

R1 preferably has a softening point of less than 50° C. Preferably, R1 has a softening point of less than 45° C. and more preferentially of less than 40° C. R1 preferably has a softening point of greater than 28° C.

Preferably, R1 has a penetrability at 25° C. of greater than 60¹⁄₁₀ mm. R1 preferably has a penetrability at 25° C. of less than 400¹⁄₁₀ mm.

Second Vacuum Residue R2

R2 is a second vacuum residue resulting from a direct distillation of a crude oil, i.e. without a stage other than the distillation of the crude oil. R2 is thus different from R1.

R2 is obtained by an atmospheric distillation followed by a vacuum distillation of a crude oil.

Preferably, said crude oil is different from a bitumen crude, which confers an advantage as a result of not being constrained by the use of a specific crude oil, e.g. a bitumen crude, constituting a small part of the world production of crude oils, as already explained above.

R2 can result from the distillation of a different crude oil from the crude oil which can be used to form the vacuum residue as feedstock of the ebullated bed hydroconversion process giving R1 and B1.

Advantageously, said crude oil is identical to the crude oil giving rise to the vacuum residue used as feedstock in the ebullated bed hydroconversion process which is the source of R1 and B1. Thus, it is possible to form a bitumen according to the invention from one and the same crude oil, which is preferably different from a bitumen crude.

R2 can have a content of asphaltenes of between 5% and 20% by weight.

R2 preferably has a softening point of less than 50° C. Preferably, R2 has a softening point of less than 45° C. and more preferentially of less than 40° C. R2 preferably has a softening point of greater than 28° C.

Preferably, R2 has a penetrability at 25° C. of greater than 60¹⁄₁₀ mm. R2 preferably has a penetrability at 25° C. of less than 400¹⁄₁₀ mm.

Flux F

According to the invention, the bitumen can contain a flux F as a mixture with the first bitumen base B1 or as a mixture with B1 and the second bitumen base B2.

F consists of at least one heavy aromatic cut having a starting point of greater than 350° C., a 90% distilled point of less than 650° C. according to Standard ASTM D2887 and a hydrogen content of greater than 8.5% by weight, and preferably consists of said heavy aromatic cut (i.e. just one heavy aromatic cut).

F is advantageously a cut of petroleum origin having a low content of saturated hydrocarbons, typically of less than 10% by weight, and having a highly aromatic tendency.

Preferably, said heavy aromatic cut is an aromatic cut extracted from vacuum distillates, which are advantageously obtained during the manufacture of lubricating oils, for example an aromatic extract resulting from the solvent extraction of vacuum distillates which are obtained in a process for the manufacture of lubricating oils. Typically, the aromatic extract resulting from processes of this type has a density of between 1000 g/l and 1050 g/l, a content of saturated hydrocarbons of less than 10% by weight, a content of aromatic compounds of greater than 50% by weight and a hydrogen content of between 8.5% and 11% by weight.

Composition of the Bitumen

According to the invention, the bitumen is a binary composition, a ternary composition or a quaternary composition.

According to one embodiment of the invention, the bitumen is a binary composition and consists either of B1 and F or of B1 and R1.

The bitumen according to the invention contains between 40% and 75% by weight of B1 when it consists of B1 and F.

The bitumen according to the invention comprises between 40% by weight and 50% by weight of B1 when it consists of B1 and B2, B2 preferably consisting of R1.

According to another embodiment, the bitumen is a ternary composition and consists of B1, B2 (consisting of R1 or R2) and F.

The bitumen according to the invention comprises between 40% by weight and 70% by weight of B1 when it consists of B1 and a mixture of F with B2.

According to one embodiment, the bitumen of ternary composition according to the invention comprises between 40% by weight and 60% by weight of B1, between 25% and 45% by weight of B2 (consisting of R1 or R2) and between 5% by weight and 15% by weight of F. More preferentially, such a bitumen of ternary composition comprises between 40% and 55% by weight of B1, between 30% and 45% by weight of B2 (consisting of R1 and/or R2) and between 5% by weight and 15% by weight of F.

According to one embodiment of the invention, the bitumen is a quaternary composition and consists of B1, B2 consisting of R1 and R2, and F.

It should be remembered that the sum of the percentages by weight of B1, B2 and F is always equal to 100%.

The bitumen according to this ternary composition preferably consists of B1, R1 and F, which has in particular the advantage that the two bitumen bases B1 and B2, B2 consisting of R1, originate from the same ebullated bed hydroconversion process treating one and the same heavy hydrocarbon feedstock.

Thus, the bitumen according to the invention can advantageously be formulated exclusively or virtually exclusively with the residues from an ebullated bed hydroconversion process: this is the case for a binary composition of a bitumen according to the invention consisting of B1 and R1. This is also the case for a ternary composition of a bitumen according to the invention consisting of B1, R1 and F, in which B1 and R1 can, for example, represent between 85% and 95% by weight of the bitumen and F can represent between 5% by weight and 15% by weight of the bitumen.

The bitumen according to the invention is advantageously a road bitumen, which has a ring and ball softening point of greater than or equal to 43° C. and less than 58° C. and a penetrability at 25° C. of greater than or equal to 35° C. and less than 100° C.

The bitumen according to the invention can be a bitumen of 35-50 to 70-100 grade according to Standard FR EN 12591.

The bitumen according to the invention can be a bitumen of PG 58-16 grade according to the North American Superpave system.

The invention thus also relates to a road surfacing consisting of a mixture of a bitumen according to the invention with an appropriate inorganic aggregate, for example aggregates, i.e. pebbles, gravel or sand.

The Ebullated Bed Hydroconversion Process

The ebullated bed hydroconversion process, for example of H-Oil™ type, for the hydroconversion of heavy hydrocarbon feedstocks is a process known to a person skilled in the art. Such a process is based on the hydroconversion of a heavy hydrocarbon feedstock in one or more three-phase hydroconversion reactors, which can be in series and/or in parallel, operating as ebullated bed, typically using the technology and under the conditions of the H-Oil™ process as described in U.S. Pat. No. 4,521,295 or U.S. Pat. No. 4,495,060 or U.S. Pat. No. 4,457,831 or U.S. Pat. No. 4,354,852, or in the paper AIChE, March 19-23, 1995, Houston, Texas, paper number 46d, "Second generation ebullated bed technology", or in chapter 3.5, "Hydroprocessing and Hydroconversion of Residue Fractions", of the work "Catalysis by Transition Metal Sulphides", published by Editions Technip in 2013. According to this implementation, each three-phase reactor is operated as a fluidized bed, known as an ebullated bed. Each reactor advantageously comprises a recirculation pump which makes it possible to maintain the catalyst as an ebullated bed by continuous recycling of at least a part of a liquid fraction advantageously withdrawn at the top of the reactor and reinjected at the bottom of the reactor.

Said process producing B1 and R1 participating in the composition of the bitumen according to the invention, and the feedstock treated in said process, are described in more detail below.

The Heavy Hydrocarbon Feedstock of the Ebullated Bed Hydroconversion Process

The feedstock treated in the ebullated bed hydroconversion process is a heavy hydrocarbon feedstock. Advantageously, this feedstock is a feedstock comprising hydrocarbon fractions produced in a refinery. The feedstocks according to the invention include feedstocks containing hydrocarbon fractions, at least 80% by weight of which have a boiling point of greater than 300° C., atmospheric residues and/or vacuum residues, atmospheric and/or vacuum residues resulting from hydrotreating, from hydrocracking and/or from hydroconversion, fresh or refined vacuum distillates, steam cracking residues, cuts originating from a cracking unit, such as FCC, coking or visbreaking, aromatic cuts extracted from a unit for the production of lubricants, deasphalted oils resulting from a deasphalting unit, asphalts resulting from a solvent deasphalting unit or similar hydrocarbon feedstocks, or a combination of these fresh feedstocks and/or refined effluents. Said feedstock can also contain a residual fraction resulting from the direct liquefaction of coal by a thermal process, with or without hydrogen, with or without catalyst (an atmospheric residue and/or a vacuum residue resulting, for example, from the H-Coal™ process), a vacuum distillate resulting from the direct liquefaction of coal, such as, for example, the H-Coal™ process, or also a residual fraction resulting from the direct liquefaction of lignocellulosic biomass, alone or as a mixture with coal and/or a fresh and/or refined petroleum fraction.

Preferably, the heavy hydrocarbon feedstock sent to the ebullated bed hydroconversion process contains, and preferably consists of, hydrocarbon fractions, at least 80% by weight of which have a starting boiling point of at least 300° C., preferably of at least 350° C. and in a preferred way of at least 375° C.

Said feedstock is preferably a crude oil or consists of atmospheric residue(s) and/or of vacuum residue(s) resulting from the atmospheric and/or vacuum distillation of a crude oil, and preferably consists of vacuum residue(s) resulting from the vacuum distillation of a crude oil, preferably having a starting boiling point of at least 450° C., more preferentially of at least 500° C. and more preferably still of at least 540° C.

All the abovementioned feedstocks contain impurities, such as metals, sulfur, nitrogen, Conradson carbon and $C_7$ asphaltenes. This is because these types of feedstocks are generally rich in impurities with contents of metals of greater than or equal to 20 ppm, indeed even of greater than or equal to 100 ppm. The sulfur content is greater than or equal to 0.5%, indeed even greater than or equal to 1% and even greater than or equal to 2% by weight. The content of $C_7$ asphaltenes amounts at a minimum to 1% by weight and is generally greater than or equal to 3% by weight. $C_7$ asphaltenes are compounds known for inhibiting the conversion of residual cuts, both by their ability to form heavy hydrocarbon residues, commonly referred to as coke, and by their tendency to produce sediments which greatly limit the operability of the hydrotreating and hydroconversion units. The Conradson carbon content is greater than or equal to 3%, indeed even greater than or equal to 5%, by weight. The Conradson carbon content is defined by Standard ASTM D 482 and represents, for a person skilled in the art, a well-known evaluation of the amount of carbon residues produced after a pyrolysis under standard temperature and pressure conditions.

The Stages of the Ebullated Bed Hydroconversion Process

The ebullated bed hydroconversion process which is the source of B1 and R1 comprises the stages a), optionally b) and c), and also the stages d) and e) described in detail below.

First Stage a) of Hydroconversion of a Heavy Hydrocarbon Feedstock

A first stage a) of hydroconversion of the heavy hydrocarbon feedstock is carried out in the presence of hydrogen in a first hydroconversion section comprising at least one three-phase reactor containing at least one hydroconversion catalyst operating as an ebullated bed.

The absolute pressure during this stage a) is between 2 MPa and 38 MPa, the temperature is between 300° C. and 550° C., the hourly space velocity, with respect to the volume of each three-phase reactor, is between 0.05 h$^{-1}$ and 10 h$^{-1}$, and the amount of hydrogen is between 50 Sm$^3$/m$^3$ and 5000 Sm$^3$/m$^3$.

This stage produces a liquid hydroconverted effluent having a reduced content of $C_7$ asphaltenes, of Conradson carbon, of metals, of sulfur and of nitrogen.

In this stage, the feedstock is transformed under specific hydroconversion conditions as described above.

Stage a) is carried out under the following preferred conditions:
 an absolute pressure of between 2 MPa and 35 MPa, more preferentially of between 5 MPa and 25 MPa and in a more preferred way of between 6 MPa and 20 MPa, and at a temperature of between 350° C. and 500° C., more preferentially of between 370° C. and 430° C. and more preferentially still of between 380° C. and 430° C.;
 an amount of hydrogen, mixed with the feedstock, preferably of between 100 Sm$^3$/m$^3$ and 2000 Sm$^3$/m$^3$ and in a very preferred way between 200 Sm$^3$/m$^3$ and 1000 Sm$^3$/m$^3$.

According to one implementation, the hourly space velocity of the reactor or "HSV" (commonly called "LHSV" for "Liquid Hourly Space Velocity") is between 0.1 h$^{-1}$ and 10 h$^{-1}$, preferably between 0.1 h$^{-1}$ and 5 h$^{-1}$ and more preferentially between 0.15 h$^{-1}$ and 2 h$^{-1}$. According to another implementation, the HSV is between 0.05 h$^{-1}$ and 0.09 h$^{-1}$ and preferably between 0.05 h$^{-1}$ and 0.08 h$^{-1}$. It concerns the HSV with respect to the reactor, defined as the ratio of the flow rate by volume of liquid feedstock which enters the reactor, measured under ambient conditions, also known as standard conditions (typically at 15° C. and 1 atm, i.e. 0.101325 MPa), with respect to the volume of the reactor.

The three-phase reactor(s) are reactors operating as an ebullated bed. The reactors can be in series and/or in parallel. The liquid heavy hydrocarbon feedstock, the hydrogen gas phase dispersed in the form of bubbles, and the catalyst, itself dispersed in the form of particles with a size typically of between 0.4 mm and 4.4 mm, are placed in the reactor.

According to one implementation, the hydroconversion reactor (or each reactor, if there are several of them) advantageously comprises a recirculation pump which makes it possible to maintain the catalyst as an ebullated bed by continuous recycling of at least a part of a liquid fraction advantageously withdrawn at the top of the reactor and reinjected at the bottom of the reactor.

The liquid recycling rate, defined as the ratio of the recycled liquid flow rate to the flow rate of incoming liquid feedstock, is generally between 1 and 10.

The hydroconversion catalyst used in hydroconversion stage a) contains one or more elements from Groups 4 to 12 of the Periodic Table of the Elements, which may or may not be deposited on a support. Use may advantageously be made of a catalyst comprising a support, preferably an amorphous support, such as silica, alumina, silica-alumina, titanium dioxide or combinations of these structures, and very preferably alumina, and at least one metal from Group VIII chosen from nickel and cobalt and preferably nickel, said element from Group VIII preferably being used in combination with at least one metal from Group VIb chosen from molybdenum and tungsten and preferably the metal from Group VIb is molybdenum.

In the present description, the groups of chemical elements are given according to the CAS classification (CRC Handbook of Chemistry and Physics, published by CRC Press, Editor in Chief D. R. Lide, 81st edition, 2000-2001). For example, Group VIII according to the CAS classification corresponds to the metals from columns 8, 9 and 10 according to the new IUPAC classification.

Advantageously, the hydroconversion catalyst of stage a) is a catalyst comprising an alumina support and at least one metal from Group VIII chosen from nickel and cobalt, preferably nickel, said element from Group VIII being used in combination with at least one metal from Group VIb chosen from molybdenum and tungsten; preferably, the metal from Group VIb is molybdenum. Preferably, the hydroconversion catalyst comprises nickel as element from Group VIII and molybdenum as element from Group VIb. The nickel content is advantageously of between 0.5% and 10%, expressed by weight of nickel oxide (NiO), and preferably between 1% and 6% by weight, and the molybdenum content is advantageously of between 1% and 30%, expressed by weight of molybdenum trioxide ($MoO_3$), and preferably between 4% and 20% by weight, with respect to the weight of the catalyst.

This catalyst is advantageously used in the form of extrudates or of beads. The beads have, for example, a diameter of between 0.4 mm and 4.0 mm. The extrudates have, for example, a cylindrical shape with a diameter of between 0.5 mm and 4.0 mm and with a length of between 1 mm and 5 mm. The extrudates can also be objects with a different shape, such as trilobes, tetralobes, which are regular or irregular, or other multilobes. Catalysts of other forms can also be used.

The size of these various forms of catalysts can be characterized by means of the equivalent diameter.

The equivalent diameter is defined as six times the ratio of the volume of the particle to the external surface area of the particle. The catalyst used in the form of extrudates, of beads or of other forms thus has an equivalent diameter of between 0.4 mm and 4.4 mm, preferably of between 0.5 mm and 4.4 mm. These catalysts are well known to a person skilled in the art.

The spent hydroconversion catalyst can, in accordance with the process, be partly replaced by fresh catalyst by withdrawal, preferably at the bottom of the reactor, and by introduction, either at the top or at the bottom of the reactor, of fresh catalyst and/or of spent catalyst and/or of regenerated catalyst and/or of rejuvenated catalyst, preferably at regular time intervals and in a preferred way in bursts or virtually continuously. The replacement of catalyst can be carried out, completely or partly, by spent and/or regenerated and/or rejuvenated catalyst resulting from the same reactor and/or from another reactor of any hydroconversion stage. The catalyst can be added with the metals in the form of metal oxides, with the metals in the form of metal sulfides, or after a preconditioning. For each reactor, the degree of replacement of the spent hydroconversion catalyst by fresh catalyst is advantageously of between 0.01 kg and 10 kg per cubic metre of feedstock treated and preferably between 0.1 kg and 3 kg per cubic metre of feedstock treated. This withdrawal and this replacement are carried out using devices which advantageously make possible the continuous operation of this hydroconversion stage.

It is also possible to send the spent catalyst withdrawn from the reactor to a regeneration zone, in which the carbon and the sulfur which it includes are removed, and then to return this regenerated catalyst to the hydroconversion stage. It is also possible to send the spent catalyst withdrawn from the reactor to a rejuvenation zone, in which most of the metals deposited are removed, before sending the spent and rejuvenated catalyst to a regeneration zone, in which the carbon and the sulfur which it includes are removed, and then to return this regenerated catalyst to the hydroconversion stage.

Stage b) of Separation of the Hydroconverted Effluent Resulting from Stage a)

This stage is optional. The process preferably comprises stage b).

According to this stage b), the hydroconverted effluent resulting from the first hydroconversion stage a) is separated in order to form at least one light fraction and one heavy fraction.

Preferably, at least a portion of the hydroconverted effluent resulting from the first stage a) is sent to the separation stage b).

This separation stage is carried out with the objective of advantageously obtaining at least one light liquid fraction, boiling preferably predominantly at a temperature of less than 350° C., and at least one heavy liquid fraction, preferably boiling predominantly at a temperature of greater than or equal to 350° C.

This separation stage b) thus produces at least two fractions, including the heavy liquid fraction, the other cut(s) being light and intermediate cuts.

The light fraction thus separated preferably contains dissolved light gases ($H_2$ and $C_1$-$C_4$), naphtha (fraction boiling at a temperature of less than 150° C.), kerosene (fraction boiling between 150° C. and 250° C.) and at least a part of the gas oil (fraction boiling between 250° C. and 375° C.).

The light fraction can be sent, at least in part, to a fractionation unit in which the light gases ($H_2$ and $C_1$-$C_4$) can be extracted from the light fraction, for example by passing through a flash drum. The gaseous hydrogen thus recovered can advantageously be recycled at the inlet of the first hydroconversion stage a).

The fractionation unit where the light fraction can be sent can also comprise a distillation column. In this case, the naphtha, kerosene and gas oil fractions of the light fraction which are sent to said column are separated.

The heavy liquid fraction resulting from the separation stage b), boiling preferably predominantly at a temperature of greater than or equal to 350° C., preferably contains at least one fraction boiling at a temperature of greater than or equal to 540° C. (also referred to as 540° C.+ fraction), which is the unconverted fraction. The heavy liquid fraction can also contain, in addition to the 540° C.+ fraction, a fraction boiling between 375° C. and 540° C., referred to as vacuum distillate. It can also optionally contain a part of the gas oil fraction boiling between 250° C. and 375° C.

This heavy liquid fraction can subsequently be sent, completely or partly, to a second hydroconversion stage c), as described below.

The separation stage b) can comprise, for its implementation, any separation means known to a person skilled in the art.

The separation can thus be carried out in one or more of the following items of separation equipment: one or more flash drums arranged in series, one or more steam- and/or hydrogen-stripping columns, an atmospheric distillation column or a vacuum distillation column.

Preferably, this separation stage b) is carried out by one or more flash drums arranged in series.

According to a preferred implementation, the separation stage b) is carried out by a single flash drum. Preferably, the flash drum is at a pressure and a temperature which are close to the operating conditions of the reactor of the hydroconversion stage a) (or of the final hydroconversion reactor, if several are employed during stage a)). This implementation is preferred, in particular because it makes it possible to reduce the number of items of equipment and thus the capital cost.

According to another implementation, the separation stage b) is carried out by a series of several flash drums, operating at operating conditions different from those of the reactor of the hydroconversion stage a), and resulting in at least the light liquid fraction being obtained, which can subsequently be sent at least in part to a fractionation unit, and at least the heavy liquid fraction being obtained, which can subsequently be sent at least in part to the second hydroconversion stage c).

In another implementation, the separation stage b) is carried out by one or more steam- and/or hydrogen-stripping columns.

In another implementation, the separation stage b) is carried out in an atmospheric distillation column which separates the liquid effluent resulting from the first hydroconversion stage a). The heavy liquid fraction recovered from the atmospheric distillation column can subsequently be sent at least in part to the second hydroconversion stage c).

In another implementation, the separation stage b) is carried out by an atmospheric distillation column separating the liquid effluent resulting from the first hydroconversion stage a), and by a vacuum distillation column receiving the residue from the atmospheric distillation column and producing the liquid heavy fraction which is subsequently sent at least in part to the second hydroconversion stage c).

The separation stage b) can also consist of a combination of the various implementations described above, in an order different from that described.

Optionally, before being sent to the second hydroconversion stage c), the liquid heavy fraction can be subjected to a steam- and/or hydrogen-stripping stage using one or more stripping columns, in order to remove, from the heavy fraction, the compounds having a boiling point of less than 540° C.

Second Hydroconversion Stage c)

This stage is optional. However, the process preferably comprises this second hydroconversion stage c).

According to stage c), the hydroconversion of the hydroconverted liquid effluent resulting from the first hydroconversion stage a), or of the heavy fraction resulting from stage b), if such a stage is employed, is carried out in the presence of hydrogen, in a second hydroconversion section comprising at least one three-phase reactor containing at least one hydroconversion catalyst operating as an ebullated bed.

The first hydroconversion stage and the second hydroconversion stage are separate stages, carried out in different hydroconversion sections.

The second hydroconversion section of the second hydroconversion stage comprises at least one three-phase reactor containing at least one hydroconversion catalyst, as described above for stage a).

The second hydroconversion stage c) is carried out in a way similar to that which was described for the first hydroconversion stage a), and its description is thus not repeated here. This applies in particular for the operating conditions, the items of equipment employed, the hydroconversion catalyst(s) used, with the exception of the specifications given below.

In stage c), the operating conditions can be more severe than in the first hydroconversion stage a), in particular by using a higher reaction temperature, remaining within the range between 300° C. and 550° C., preferably between 350° C. and 500° C. and more preferably between 370° C. and 450° C., or else by reducing the amount of hydrogen introduced into the reactor, remaining in the range between 50 $Sm^3/m^3$ and 5000 $Sm^3/m^3$ of liquid feedstock, preferably between 100 $Sm^3/m^3$ and 2000 $Sm^3/m^3$ and more preferably still between 200 $Sm^3/m^3$ and 1000 $Sm^3/m^3$. The other pressure and HSV parameters are within ranges identical to those described for the first hydroconversion stage a).

Stage d) of Fractionation of the Hydroconverted Effluent

A stage d) of fractionation of a part or of the whole of the liquid hydroconverted effluent resulting from the first hydroconversion stage a) or of the liquid hydroconverted effluent resulting from the second hydroconversion stage c), if stage c) is employed, is carried out, in particular by atmospheric distillation followed by a vacuum distillation.

At least the first vacuum residue R1 is thus produced, which residue boils preferably predominantly at a temperature of greater than or equal to 350° C., R1 preferably containing a residual fraction boiling at a temperature of greater than or equal to 540° C.

The fractionation stage d) is carried out in an atmospheric distillation column and a vacuum column which receives the atmospheric residue. According to one embodiment, stage d) also comprises the use of one or more flash drums upstream of the atmospheric distillation column.

The fractionation stage d) is carried out with the objective of separating the effluents having different cut points and advantageously of obtaining at least one liquid heavy fraction referred to here as first vacuum residue R1, which is an unconverted vacuum residue, also generally referred to as UCO (for Unconverted Oil), boiling preferably predominantly at a temperature of greater than or equal to 350° C., more preferentially of greater than or equal to 500° C. and more preferably still of greater than or equal to 540° C.

Stage e) of Deasphalting R1 Resulting from Stage d)

In stage e) of the process, a solvent deasphalting (SDA) of R1 resulting from stage d) is carried out.

Solvent deasphalting is well known to a person skilled the art. Reference may thus be made to the paper by Billon et al. published in 1994 in Volume 49, No. 5, of the Revue de l'Institut Français du Pétrole, pages 495 to 507, to the book "Raffinage et conversion des produits lourds du pétrole" [Refining and conversion of heavy petroleum products] by J F Le Page, S G Chatila and M Davidson, Edition Technip, pages 17-32, or to U.S. Pat. Nos. 4,239,616, 4,354,922, 4,354,928, 4,440,633, 4,536,283 and 4,715,946. Deasphalting is a liquid-liquid extraction generally carried out at a mean temperature of between 60° C. and 250° C. with at least one hydrocarbon solvent having from 3 to 7 carbon atoms, preferably a paraffinic hydrocarbon solvent.

Stage e) is preferably carried out at a temperature of between 40° C. and 150° C., preferably of between 45° C. and 130° C., and a pressure of between 2 MPa and 6 MPa and more preferentially of between 3 MPa and 6 MPa.

The deasphalting is advantageously carried out with at least one hydrocarbon solvent comprising predominantly, preferably more than 80%, compounds having from 3 to 4 carbon atoms, such as butane or propane or their mixture.

At least one additive can optionally be added to the solvent(s). The solvents which can be used and the additives are widely described in the literature.

The solvent/feedstock ratio (volume/volume) entering the deasphalter is preferably between 4/1 and 10/1, preferably between 5/1 and 10/1 and more preferentially between 5/1 and 9/1.

This stage e) produces a deasphalted fraction, commonly referred to as DAO (for Deasphalted Oil), and an asphalt, sometimes referred to as deasphalting pitch.

The deasphalting can be carried out in one or more mixer-settlers or in one or more extraction columns. The deasphalter thus comprises at least one mixer-settler or at least one extraction column.

It is also possible and advantageous to carry out the recovery of the solvent according to the opticritical process, that is to say by using a solvent under supercritical conditions in the separation section, which is a section which can be used to implement an integrated sub-stage for separation of the fraction comprising the DAO and solvent or mixture of solvents. This opticritical process makes it possible in particular to considerably improve the overall economics of the process.

In the context of the present invention, it is preferred to employ a technique using at least one extraction column and preferably only one (for example the Solvahl™ process).

The DAO yield is generally between 30% by weight and 95% by weight according to the operating conditions and the solvent which are used and according to the feedstock sent to the deasphalter and in particular the quality of the vacuum residue R1 resulting from the fractionation stage d).

Table 1 below gives the ranges of the operating conditions which are typical for the deasphalting as a function of the solvent:

TABLE 1

| Solvent | Propane | Butane |
| --- | --- | --- |
| Pressure (MPa) | 3-6 | 3-6 |
| Mean temperature (° C.) | 45-90 | 80-130 |
| Solvent/Feedstock ratio (v/v) | 6-10 | 5-8 |

The conditions of the deasphalting are suitable for the quality of the DAO to be obtained and for the feedstock entering the deasphalting but also for the quality of the asphalt according to the use which it is desired to make of it, said asphalt being harder as the molecular weight of the paraffinic solvent increases.

Stage e) produces a DAO virtually devoid of $C_7$ asphaltenes and an asphalt which concentrates most of the impurities of the vacuum residue R1.

The deasphalted hydrocarbon cut DAO obtained advantageously exhibits a content of $C_7$ asphaltenes of less than 0.5% by weight, preferably of less than 0.1% by weight and better still of less than 0.08% or than 0.07% by weight, with respect to the total weight of said cut.

The asphalt obtained advantageously exhibits a content of $C_7$ asphaltenes of between 10% and 40% by weight and typically a content of saturated hydrocarbons of less than 6% by weight, with respect to the total weight of said asphalt.

In one embodiment, all or preferably a part of said deasphalted fraction DAO is recycled in stage a) and/or in stage c).

The Process for the Preparation of a Bitumen

A bitumen according to the invention is prepared by carrying out stages a) to e) of the ebullated bed hydroconversion process described above and by mixing, according to a stage f) of preparation of a bitumen, a part or all of the asphalt resulting from stage e) as B1 with B2 and/or F, B2 consisting of a part of R1 resulting from stage d) or of a second vacuum residue R2 resulting from the distillation of a crude oil or of a mixture of R1 and R2, and F consisting of at least one heavy aromatic cut.

The mixture is such that the bitumen comprises between 40% and 75% by weight of B1 and between 25% and 60% by weight of B2 and/or F, with at the most 75% by weight of B1 when said bitumen consists of B1 and F, at the most 50% by weight of B1 when said bitumen consists of B1 and B2, and at the most 60% by weight of B1 when said bitumen consists of B1 and a mixture of F with B2.

The mixing in stage f) can be carried out in particular with stirring, at a temperature sufficient to provide homogeneous mixing of B1 with B2 and/or F, at a temperature greater by at least 100° C. than the softening point of each of the bases used, for example at a temperature of between 150° C. and 250° C.

The methods for measurements of the main standardized physical properties (NF EN 12591) of the bitumens according to the invention, and of the bitumen bases making up the bitumen according to the invention, are summarized below.

The penetrability at 25° C. is the needle penetrability measured according to Standard EN 1426 (or equivalent Standard ASTM D5). The needle penetrability is the depth of sinking, expressed in tenths of a millimetre, of a standardized needle with a diameter of 1 mm, under a load of 100 g, applied for 5 s to a sample of bitumen held most commonly at 25° C. or also at 15° C. At a given temperature, the harder the bitumen, the weaker its penetrability. The penetrability is used to classify the various grades of bitumens in the European system (NF EN 12591).

Like all residual fractions consisting of tens of thousands of molecules with a very low content of linear paraffins, and unlike waxes and paraffins, bitumens do not have a sharp melting point. For this reason, a standardized method, referred to as softening point or Ring and Ball Temperature (RBT), has been developed for bitumens. The RBT is measured according to Standard EN 1427 (or equivalent Standard ASTM D36): a small steel ball of 3.5 g and with a diameter of 9.5 mm is placed on a disc of bitumen poured beforehand into a ring with an internal diameter of 19.8 mm, itself placed on a standardized support. The assembly is put in a water bath, the initial and stabilized temperature of which is 5° C. The lower face of the ring of bitumen is at 25.4 mm from the upper surface of the plate of the bottom of the support, which corresponds to the distance which the ball will fall during the test. The bath is heated at a constant rate of 5° C./min, with stirring, and the ring and ball softening point (denoted RBT) is the temperature at which the bitumen pocket, formed during the fall of the ball, touches the reference plate placed at 25.4 mm under the ring of bitumen. In this test, the higher the softening point, the harder the bitumen.

The test of resistance to hardening under the effect of heat and air, referred to as RTFOT (Rolling Thin Film Oven Test) method, according to Standard NF EN 13607-1 (or equivalent Standard ASTM D2872), makes it possible to measure the combined effects of heat and air on a thin film of bitumen in permanent renewal. It simulates the hardening which a bitumen undergoes during kneading in a mixing plant typically operating between 150° C. and 180° C. A film of bitumen in permanent renewal is heated in an oven at 163° C. for 75 min, and while continually flushing with hot air. The hardening of the bitumen as a result of the joint effect of the evaporation of the lighter fractions and of the oxidation resulting in a hardening of the bitumen is measured by measuring the decrease in penetrability (EN 1426) and the increase in the softening point (EN 1427), before and after test. This delta is limited in European specifications as a function of the grade of bitumens (NF EN 12591). The variation in weight of the sample (expressed as percentage) is also measured, and the change in the dynamic viscosity can also be measured (EN 12596) before and after being placed in the oven.

Other parameters appearing in Standard NF EN 12591 can be measured, according to the standardized methods mentioned in Standard NF EN 12591. Mention may be made of the following parameters, without being exhaustive, and of their associated standards: the flash point (Cleveland method, EN ISO 2592), the solubility (in perchloroethylene $C_2Cl_4$, EN 12592), the content of paraffins (EN 12606-2), the dynamic viscosity at 60° C. (referred to as "VD60", EN 125956), the kinematic viscosity at 135° C. (referred to as "VC135", EN 125956), the Fraass point (referred to as "FRAASS", EN 12593). Their description is not described in detail here and a person skilled in the art can consult said prescriptive documents for any necessary measurement.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 2008827, filed Aug. 31, 2020 are incorporated by reference herein.

EXAMPLES

The examples below illustrate, nonlimitingly, the formulation of bitumens according to the invention (Examples 2 and 3) and the use of unconventional bases for formulating such bitumens.

The properties of the bitumen bases and bitumens mentioned in the examples are the properties described above, based on measurements also already described above.

Example 1: Bitumen Bases and Flux

The following five bitumen bases and the following flux are used in the examples of formulation of bitumens presented below.

The three bitumen bases pitch1VR1, VR1 and VRSR are obtained from a vacuum residue of the straight run primary fractionation (VRSR) of a Ural crude oil. Ural crude is not a bitumen crude but has formed the subject of numerous research and development studies and constitutes one of the most widely used feedstocks in ebullated bed hydroconversion processes of H-Oil™ type.

The two bitumen bases pitch1VR3, VR3 are obtained from a vacuum residue of the primary fractionation (VRSR) of a mixture of Arabian Heavy (AH) and Arabian Light (AL) crude oils.

The bitumen bases pitch1VR1, VR1, pitch1VR3 and VR3 result from an ebullated bed hydroconversion process of H-Oil™ type as described below.

Base Pitch1VR1: example of bitumen base B1. This bitumen base is an asphalt obtained by a butane deasphalting of a residue VR1 resulting from the vacuum distillation of an effluent hydroconverted by a process for the ebullated bed hydroconversion of H-Oil™ type of a feedstock consisting of a vacuum residue of a Ural crude oil. The degree of conversion of the feedstock in the hydroconversion process is moderate, of 55%.

Base Pitch1VR3: example of bitumen base B1. This bitumen base is an asphalt obtained by a propane deasphalting of a residue VR3 resulting from the vacuum distillation of an effluent hydroconverted by a process for the ebullated bed hydroconversion of a feedstock consisting of a vacuum residue of an AH/AL (75/25) mixture. The degree of conversion of the feedstock in the hydroconversion process is high, of 80%.

Base VR1: example of bitumen base B2=R1. This bitumen base is the vacuum residue VR1 resulting from the vacuum distillation of the effluent hydroconverted by the process for the ebullated bed hydroconversion of H-Oil™ type of the feedstock consisting of the vacuum residue of a Ural crude oil. It is the same hydroconversion process as that producing the base Pitch1VR1 (degree of conversion of the hydroconversion process: 55%).

Base VR3: example of bitumen base B2=R1. This bitumen base is the vacuum residue VR3 resulting from the vacuum distillation of the effluent hydroconverted by the process for the ebullated bed hydroconversion of H-Oil™ type of the feedstock consisting of the vacuum residue of an AH/AL (75/25) mixture. It is the same hydroconversion process as that producing the base Pitch1VR3 (degree of conversion of the hydroconversion process: 80%).

Base VRSR: example of bitumen base B2=R2. This bitumen base is obtained by atmospheric and vacuum distillation of a Ural crude oil. The Ural crude oil is the same crude oil as that from which the vacuum residue (VR Ural) used as feedstock of the hydroconversion process producing the bitumen bases Pitch1VR1 and VR1 results.

Flux Fs: example of flux F. The flux Fs is an aromatic extract resulting from the manufacture of lubricating oils.

The five bases pitch1VR1, pitch1VR3, VR1, VR3 and VRSR cannot in themselves alone (taken independently) form a bitumen meeting the standards for road bitumens, in particular according to Standard NF EN 12591.

The main characteristics of the feedstocks used in the ebullated bed hydroconversion process are given in Table 2 below.

The abbreviation "HPLC" for the measurement of the saturated hydrocarbons, aromatic hydrocarbons and resins refers to a method of separation by high performance liquid chromatography.

The objective of the separation method used is to quantitatively fractionate the oil samples having a starting boiling point of greater than 350° C. into four families called: saturated hydrocarbons, aromatic hydrocarbons, resin fraction and asphaltene fraction. It breaks down into two stages:

The first stage of the method consists in precipitating the asphaltenes from an excess of n-heptane. After the precipitation, the sample is filtered in order to extract the asphaltenes and to dry them before weighing them. The n-heptane present in the filtrate is subsequently evaporated under vacuum. The filtered sample freed from the n-heptane is referred to as maltenes. This first stage refers to the method of measurement of $C_7$ asphaltenes according to Standard ASTM D6560 (corresponding to Standard NF T60-115).

The second stage consists of the weighing of a part of the maltenes which is injected onto a chromatographic column filled with a mixture of silica and alumina. The fraction of saturated hydrocarbons is eluted by circulation of n-heptane. The fraction of aromatic hydrocarbons is eluted with a mixture of n-heptane and toluene. Finally, the resins are eluted with a mixture of dichloromethane, toluene and methanol. All the material eluted at the column outlet is collected in order to catch each of the fractions separately. The contents of saturated hydrocarbons, aromatic hydrocarbons and resins are determined by weighing the materials collected after complete evaporation of the solvents.

TABLE 2

| Feedstock of the hydroconversion process (sent to the first hydroconversion stage) | | VR SR Ural | VR SR (AH/AL) |
|---|---|---|---|
| Density | kg/m³ | 1004 | 1042 |
| Dynamic viscosity at 100° C. | MPa · s | 436 | 3307 |
| Hydrogen content | % by weight | 10.8 | 10.2 |
| Conradson carbon | % by weight | 15.4 | 21.6 |
| Saturates HPLC | % by weight | 12.3 | 9.5 |
| Aromatics HPLC | % by weight | 43.1 | 39.5 |
| Resins HPLC | % by weight | 39.3 | 37.4 |
| $C_7$ Asphaltenes | % by weight | 5.1 | 13.6 |
| Range bitumens (NF EN 12591) in penetrability | 1/10 mm | 250-350 | 70-100 |
| Range bitumens (NF EN 12591) in RBT | ° C. | 30-38 | 43-51 |

The compositions and main characteristics of each of the bitumen bases are given respectively in Table 3 (chemical composition of the bitumen bases—cf. Table 2 for VRSR=VR SR Ural) and Table 4 (physical parameters of the bitumen bases) below.

TABLE 3

| | | Bitumen bases | | | |
|---|---|---|---|---|---|
| | units | Pitch1VR1 | Pitch1VR3 | VR1 | VR3 |
| Hydrogen content | % by weight | 8.8 | 8.2 | 10.2 | 10.3 |
| Conradson carbon | % by weight | 35.1 | 44.8 | 20.5 | 27.4 |
| Aromatic carbon | % by weight | 46.8 | 55.5 | 35.1 | 36.7 |
| Saturates HPLC | % by weight | 4.5 | 2.1 | 16.1 | 16.5 |
| Aromatics HPLC | % by weight | 27.2 | 31.2 | 37.7 | 43.5 |
| Resins HPLC | % by weight | 49.6 | 46.0 | 37.1 | 30.8 |
| $C_7$ Asphaltenes | % by weight | 18.7 | 20.7 | 9.1 | 9.2 |

TABLE 4

| | units | Pitch1VR1 | Pitch1VR3 | VR1 | VR3 | VRSR (= VR SR Ural) |
|---|---|---|---|---|---|---|
| Density | kg/m$^3$ | 1124 | 1120 | 1020 | 1019 | 1004 |
| Dynamic viscosity at 100° C. | MPa.s | 24 215 | 216 022 | 318 | 364 | 436 |
| Ring and ball softening point (RBT) | ° C. | 71.8 | 89.5 | 30 | 33.4 | 33.8 |
| Penetrability at 25° C. | 1/10 mm | 3 | 0 | 246 | 400 | 270 |
| RBT after RTFOT | ° C. | 81 | 97 | 34.6 | 40.2 | 36.6 |
| Penetrability at 25° C. after RTFOT | ° C. | 2 | 0 | 241 | 384 | 257 |
| Delta RBT | ° C. | 9.2 | 4.5 | 4.6 | 6.8 | 2.8 |
| % of penetrability remaining at 25° C. | % | 67 | — | 98% | 95% | 95% |
| Range bitumen before RTFOT in penetrability | 1/10 mm | Outside range Too hard | Outside range Too hard | 250-350 | Outside range Too soft | 250-350 |
| Delta RBT max according to NF EN 12591 | ° C. | — | — | 11 | — | 11 |
| % of penetrability remaining at 25° C. min. according to NF EN 12591 | % | — | — | 35 | — | 35 |

The composition of the flux Fs is given in Table 5 below.

TABLE 5

| | units | Flux Fs |
|---|---|---|
| Density | Kg/m$^3$ | 1020 |
| Kinematic viscosity at 100° C. | mm$^2$/s | 95.0 |
| Hydrogen content | % by weight | 10.2 |
| Conradson carbon | % by weight | 8.1 |
| Saturates HPLC | % by weight | 8.3 |
| Aromatics HPLC | % by weight | 68.8 |
| Resins HPLC | % by weight | 23.8 |
| C$_7$ Asphaltenes | % by weight | 0.1 |
| Simulated distillation | | |
| Starting point | ° C. | 383 |
| 10% distilled | ° C. | 503 |
| 50% distilled | ° C. | 549 |
| 90% distilled | ° C. | 576 |
| Final point | ° C. | — |

The ebullated bed hydroconversion process making it possible to obtain the bitumen bases pitch1VR1, VR1, pitch1VR3 and VR3 comprises the hydroconversion stages a), b), c), d) and e) as described in the general description, with the specific features given in the tables below.

The hydroconversion stages each employ a reactor operating as an ebullated bed and containing a NiMo/alumina hydroconversion catalyst exhibiting a NiO content of 4% by weight and a MoO$_3$ content of 10% by weight, the percentages being expressed with respect to the total weight of the catalyst.

TABLE 6

| Operating conditions of the first hydroconversion stage | | Feedstock VR SR Ural | Feedstock VR SR (AH/AL) |
|---|---|---|---|
| HSV reactor | h$^{-1}$ | 0.2 | 0.15 |
| Temperature | ° C. | 420 | 420 |
| Pressure | MPa | 16 | 16 |
| Amount of hydrogen | Sm$^3$/m$^3$ | 700 | 700 |

TABLE 7

| Operating conditions of the second hydroconversion stage | | For the process with feedstock VR SR Ural | For the process with feedstock VR SR (AH/AL) |
|---|---|---|---|
| HSV reactor | h$^{-1}$ | 0.2 | 0.15 |
| Temperature | ° C. | 420 | 425 |
| Pressure | MPa | 16 | 16 |
| Amount of hydrogen | Sm$^3$/m$^3$ | 700 | 700 |

TABLE 8

| Operating conditions of the deasphalting section | | For the process with feedstock VR SR Ural | For the process with feedstock VR SR (AH/AL) |
|---|---|---|---|
| Solvent | — | C4 cut | C3 cut |
| Mean temperature | ° C. | 120 | 65 |
| Total pressure | MPa | 4 | 2.5 |
| Solvent/feedstock ratio | m$^3$/m$^3$ | 6 | 8 |

Example 2: Bitumens in Accordance According to a Binary Formulation

Two bitumens according to the invention are formulated according to the binary mixtures below.

Mixture Mix1: pitch1VR1/VR1 mixture (40/60 as % by weight)

Mixture Mix2: pitch1VR1/Flux Fs mixture (60/40 as % by weight)

The main characteristics of the bitumens Mix1 and Mix2 are given in Table 9 below.

TABLE 9

| Bitumen base | units | Mix1 | Mix2 |
| --- | --- | --- | --- |
| Ring and ball softening point (RBT) | ° C. | 44.8 | 43.4 |
| Penetrability at 25° C. | 1/10 mm | 75.3 | 100 |
| RBT after RTFOT | ° C. | 53 | 49.2 |
| Penetrability at 25° C. after RTFOT | 1/10 mm | 38 | 52 |
| Delta RBT | ° C. | 8.2 | 5.8 |
| % of penetrability remaining at 25° C. | % | 50 | 52 |
| Range bitumen before RTFOT in penetrability | 1/10 mm | 70-100 | 70-100 |

Example 3: Bitumens in Accordance According to a Ternary Formulation

Three bitumens according to the invention are formulated according to the ternary mixtures below.

Mixture Mix3: mixture of 90.9% by weight of pitch1VR1/VR1 (60/40) with 9.1% by weight of Fs.

Mixture Mix4: mixture of 90.9% by weight of pitch1VR1/VRSR (60/40) with 9.1% by weight of Fs.

Mixture Mix5: mixture of 87.7% by weight of pitch1VR3/VR3 (60/40) with 12.3% by weight of Fs.

The main characteristics of the bitumens Mix3 to Mix5 are given in Table 10 below.

TABLE 10

| Bitumen base | units | Mix3 | Mix4 | Mix5 |
| --- | --- | --- | --- | --- |
| Ring and ball softening point (RBT) | ° C. | 46.0 | 50.4 | 51.6 |
| Penetrability at 25° C. | 1/10 mm | 62 | 40 | 29 |
| RBT after RTFOT | ° C. | 63.2 | 58.4 | 57.6 |
| Penetrability at 25° C. after RTFOT | 1/10 mm | 13 | 25 | 17 |
| Delta RBT | ° C. | 7.8 | 8 | 6 |
| % of penetrability remaining at 25° C. | % | 53 | 63 | 59 |
| Range bitumen before RTFOT in penetrability | 1/10 mm | 50-70 | 35-50 | 20-30 |
| Delta RBT max according to NF EN 12591 | ° C. | 9 | 8 | 11 |
| % of penetrability remaining at 25° C. min. according to NF EN 12591 | % | 50 | 53 | 55 |

Example 4: Bitumens According to a Binary Formulation (not in Accordance with the Invention)

Two bitumens not in accordance with the invention are formulated according to the binary mixtures below.

Mixture Mix6: pitch1VR1/VR1 mixture (60/40 as % by weight)

Mixture Mix7: pitch1VR1/Flux Fs mixture (80/20 as % by weight)

The main characteristics of the bitumens Mix6 and Mix7 are given in Table 11 below.

TABLE 11

| Bitumen base | units | Mix6 | Mix7 |
| --- | --- | --- | --- |
| Ring and ball softening point (RBT) | ° C. | 53.4 | 54.2 |
| Penetrability at 25° C. | 1/10 mm | 26 | 24 |
| RBT after RTFOT | ° C. | 62.4 | 63.2 |
| Penetrability at 25° C. after RTFOT | 1/10 mm | 16 | 13 |
| Delta RBT | ° C. | 9.2 | 9 |
| % of penetrability remaining at 25° C. | % | 62 | 54 |
| Range bitumen before RTFOT in penetrability | 1/10 mm | 20-30 | 20-30 |
| Delta RBT max according to NF EN 12591 | ° C. | 8 | 8 |
| % of penetrability remaining at 25° C. min. according to NF EN 12591 | % | 55 | 55 |

Example 5: Bitumens According to a Ternary Formulation (not in Accordance with the Invention)

Three bitumens not in accordance with the invention are formulated according to the ternary mixtures below.

Mixture Mix8: mixture of 90.9% by weight of pitch1VR1/VR1 (80/20) with 9.1% by weight of Fs.

Mixture Mix9: mixture of 90.9% by weight of pitch1VR1/VRSR (80/20) with 9.1% by weight of Fs.

The main characteristics of the bitumens Mix8 and Mix9 are given in Table 12 below.

TABLE 12

| Bitumen base | units | Mix8 | Mix9 |
| --- | --- | --- | --- |
| Ring and ball softening point (RBT) | ° C. | 53.6 | 55.8 |
| Penetrability at 25° C. | 1/10 mm | 25 | 20 |
| RBT after RTFOT | ° C. | 62.2 | 64.8 |
| Penetrability at 25° C. after RTFOT | 1/10 mm | 15 | 12 |
| Delta RBT | ° C. | 8.6 | 9 |
| % of penetrability remaining at 25° C. | % | 60 | 60 |
| Range bitumen before RTFOT in penetrability | 1/10 mm | 20-30 | 20-30 |
| Delta RBT max according to NF EN 12591 | ° C. | 8 | 8 |
| % of penetrability remaining at 25° C. min. according to NF EN 12591 | % | 55 | 55 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Bitumen comprising:
   between 40% and 75% by weight of a first bitumen base B1 consisting of an asphalt obtained by a solvent deasphalting of a first vacuum residue R1 resulting from the distillation of an effluent hydroconverted by a process for the ebullated bed hydroconversion of a heavy hydrocarbon feedstock, B1 having a softening point of between 50° C. and 110° C., and
   between 25% and 60% by weight of a second bitumen base B2 and/or of a flux F, F consisting of at least one heavy aromatic cut having a starting point of greater than 350° C., a 90% distilled point of less than 650° C. according to Standard ASTM D2887 and a hydrogen content of greater than 8.5% by weight, B2 consisting of R1 or a second vacuum residue R2 resulting from a distillation of a crude oil or consisting of a mixture of R1 and of R2,
   the sum of the percentages by weight of B1, B2 and F being equal to 100%, and
   wherein said bitumen consists of:
   between 40% and 75% by weight of B1 if said bitumen consists of B1 and F,
   between 40% and 50% by weight of B1 if said bitumen consists of B1 and B2, and between 40% and 70% by weight of B1 if said bitumen consists of B1 and a mixture of F with B2.

2. The bitumen according to claim 1, in which said heavy aromatic cut is an aromatic cut extracted from vacuum distillates obtained in a process for the manufacture of lubricating oils.

3. The bitumen according to claim 1, in which said heavy hydrocarbon feedstock sent into the hydroconversion process contains hydrocarbon fractions, at least 80% by weight of which have a starting boiling point of at least 300° C., or consists of atmospheric residues and/or of vacuum residues resulting from the atmospheric and/or vacuum distillation of a crude oil.

4. The bitumen according to claim 1, in which R2 results from the atmospheric and vacuum distillation of a crude oil having been used as feedstock in the ebullated bed hydroconversion process.

5. The bitumen according to claim 1, in which R1 comprises a residual fraction boiling at a temperature of greater than or equal to 540° C. and is obtained by atmospheric and vacuum distillation of the effluent hydroconverted by the process for the ebullated bed hydroconversion of the heavy hydrocarbon feedstock, said process comprising at least one hydroconversion stage, carried out under an absolute pressure of between 2 and 38 MPa, at a temperature of between 300° C. and 550° C., at an hourly space velocity HSV, with respect to the volume of each three-phase reactor, of between 0.0511 $h^{-1}$ and 1011 $h^{-1}$ and under an amount of hydrogen mixed with the heavy hydrocarbon feedstock of between 50 and 5000 standard cubic meters ($Sm^3$) per cubic meter ($m^3$) of heavy hydrocarbon feedstock.

6. The bitumen according to claim 1, in which B1 is an asphalt obtained by a deasphalting of R1 with a hydrocarbon solvent predominantly comprising compounds having 3 to 4 carbon atoms, with a solvent/feedstock ratio volume/volume of between 4/1 and 10/1, a temperature of between 40° C. and 150° C., and a pressure of between 2 MPa and 6 MPa.

7. The bitumen according to claim 1, consisting of B1 and R1.

8. The bitumen according to claim 1, consisting of B1 and F.

9. The bitumen according to claim 1, consisting of B1 and a mixture of R1 and/or R2 with F.

10. The bitumen according to claim 9, in which B1 represents between 50% and 60% by weight of said bitumen, R1 and/or R2 represents between 25% and 45% by weight of said bitumen and F represents between 5% by weight and 15% by weight of said bitumen.

11. The bitumen according to claim 9, in which B1 represents between 40% and 60% by weight of said bitumen, R1 and/or R2 represents between 25% and 45% by weight of said bitumen and F represents between 5% by weight and 15% by weight of said bitumen.

12. The bitumen according to claim 11, in which B1 represents between 40% and 55% by weight of said bitumen, R1 and/or R2 represents between 30% and 45% by weight of said bitumen and F represents between 5% by weight and 15% by weight of said bitumen.

13. The bitumen according to claim 9, consisting of B1 and a mixture of R1 and F and in which B1 and R1 represent between 85% and 95% by weight of said bitumen and F represents between 5% by weight and 15% by weight of said bitumen.

14. The bitumen according to claim 1, which is a road bitumen having a ring and ball softening point of greater than or equal to 43° C. and less than 58° C. and a penetrability at 25° C. of greater than or equal to 35° C. and less than 100° C.

15. A road surfacing consisting of a mixture of the bitumen according to claim 1 with a mineral aggregate.

16. A road comprising the bitumen according to claim 1.

17. A process for preparing the bitumen according to claim 1, said process comprising:
   a first stage a) of hydroconversion of a heavy hydrocarbon feedstock, carried out in the presence of hydrogen in a first hydroconversion section comprising at least one three-phase reactor containing at least one hydroconversion catalyst operating as an ebullated bed, at an absolute pressure of between 2 MPa and 38 MPa, at a temperature of between 300° C. and 550° C., at an hourly space velocity, with respect to the volume of each three-phase reactor, of between 0.05 $h^{-1}$ and 1011 $h^{-1}$, and with an amount of hydrogen of between 50 $Sm^3/m^3$ and 5000 $Sm^3/m^3$, so as to obtain a liquid hydroconverted effluent having a reduced content of $C_7$ asphaltenes, of Conradson carbon, of metals, of sulfur and of nitrogen;
   optionally a stage b) of separation of the hydroconverted effluent resulting from the first hydroconversion stage to form at least one light fraction and one heavy fraction;
   optionally a second stage c) of hydroconversion of the liquid hydroconverted effluent resulting from the first hydroconversion stage a) or of the heavy fraction resulting from stage b), carried out in the presence of hydrogen in a second hydroconversion section comprising at least one three-phase reactor containing at least one hydroconversion catalyst operating as an ebullated bed, at an absolute pressure of between 2 MPa and 38 MPa, at a temperature of between 300° C. and 550° C., at an hourly space velocity, with respect to the volume of each three-phase reactor, of between 0.05 $h^{-1}$ and 1011 $h^{-1}$, and with an amount of hydrogen of between 50 $Sm^3/m^3$ and 5000 $Sm^3/m^3$;
   a stage d) of atmospheric distillation followed by a vacuum distillation of a part or of the whole of the liquid hydroconverted effluent resulting from the first hydroconversion stage a) or of the liquid hydroconverted effluent resulting from the second hydroconversion stage c), producing at least one first vacuum residue R1 boiling predominantly at a temperature of greater than or equal to 350° C., said vacuum residue containing a residual fraction boiling at a temperature of greater than or equal to 540° C.;
   a stage e) of deasphalting said first vacuum residue R1 resulting from stage d), at a temperature of between 40° C. and 150° C. and a pressure of between 2 and 6 MPa, with at least one hydrocarbon solvent predominantly comprising compounds having from 3 to 4 carbon atoms, and a solvent/feedstock ratio volume/volume of between 4/1 and 10/1, producing a deasphalted fraction DAO and an asphalt;
   a stage f) of preparation of a bitumen comprising the mixing of a part or of the whole of the asphalt resulting from stage e) as a first bitumen base B1 with a second bitumen base B2 and/or a flux F, B2 consisting of a part of said first vacuum residue R1 and/or a second vacuum residue R2 resulting from the distillation of a crude oil, and F consisting of at least one heavy aromatic cut having a starting point of greater than 350° C., a 90% distilled point of less than 650° C. according to Standard ASTM D2887 and a hydrogen content of greater than 8.5% by weight, in order to produce said bitumen so that it consists of between 40% and 75% by weight of B1 and between 25% and 60% by weight of B2 and/or F, with at the most 75% by weight of B1 when said bitumen consists of B1 and F, at the most 50% by weight of B1 when said bitumen consists of B1 and B2, and at the most 70% by weight of B1 when said bitumen consists of B1 and a mixture of F with B2, the sum of the percentages by weight of B1, B2 and F being equal to 100%.

* * * * *